Aug. 14, 1951 — R. H. McCOY — 2,564,269
HAND POWER SHEARS
Filed Dec. 15, 1947 — 2 Sheets-Sheet 1
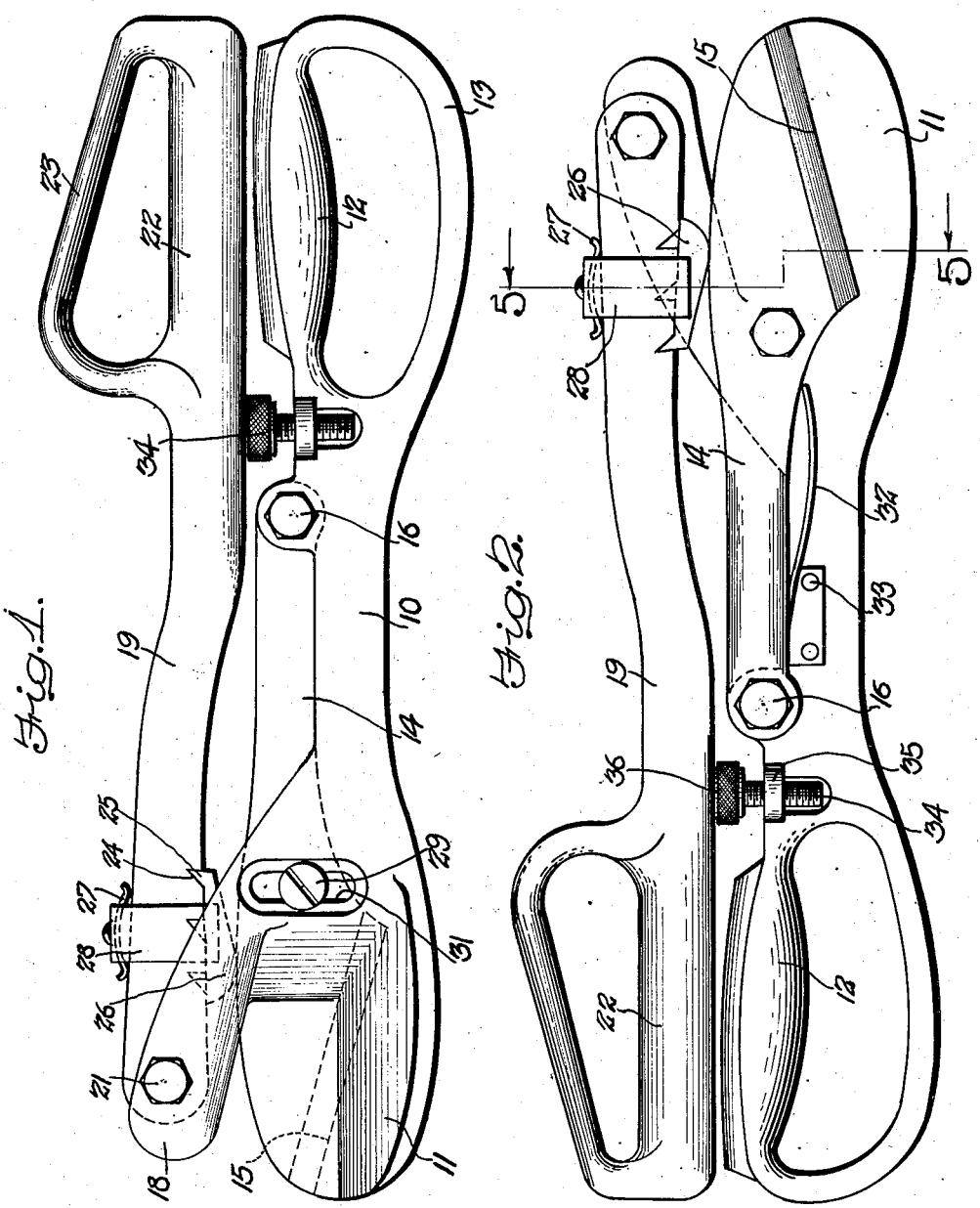
INVENTOR.
Robert H. McCoy.
BY Victor J. Evans & Co.
ATTORNEYS Aug. 14, 1951  R. H. McCOY  2,564,269
HAND POWER SHEARS
Filed Dec. 15, 1947  2 Sheets-Sheet 2
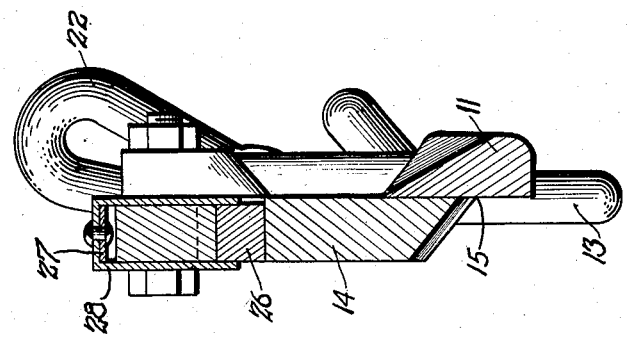
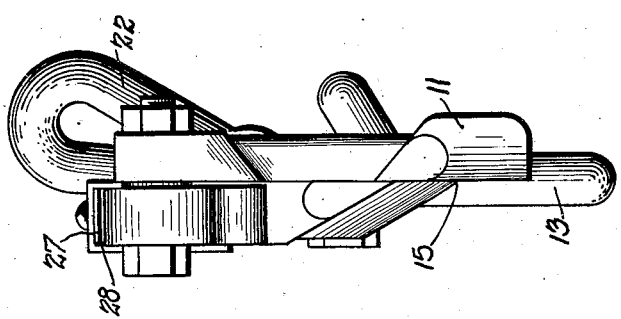
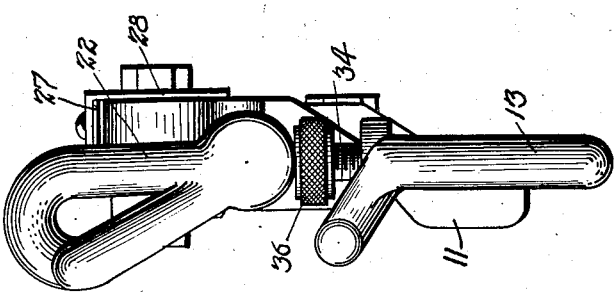
INVENTOR.
Robert H. McCoy
BY Victor J. Evans & Co.
ATTORNEYS Patented Aug. 14, 1951

2,564,269

UNITED STATES PATENT OFFICE 2,564,269

HAND-POWER SHEARS

Robert H. McCoy, Salt Lake City, Utah

Application December 15, 1947, Serial No. 791,853

2 Claims. (Cl. 30—250)

This invention relates to hand power shears for cutting sheet metal.

It is an object of the present invention to provide power shears which have incorporated in them magnified leverage to enable the shears to be operable upon heavy metals without the size of the same being increased beyond the size of the present hand shear now used for sheet metal of small thickness.

Other objects of the present invention are to provide hand power shears for cutting heavy sheet metal which is of simple construction, durable and strong, inexpensive to manufacture, easy to adjust to obtain different leverages, and length of cut, and efficient in operation.

For other objects and for a better understanding of the invention, reference may be had to the following detailed description taken in connection with the accompanying drawing, in which Fig. 1 is a side elevational view of the hand shears embodying the features of the present invention.

Fig. 2 is a side elevational view looking upon the shears from the opposite direction than as shown in Fig. 1.

Fig. 3 is an end elevational view looking upon the handle end of the shears.

Fig. 4 is an end elevational view looking upon the cutting edges of the shears.

Fig. 5 is a sectional view taken on line 5—5 of Fig. 2, and looking in the direction of the arrows thereof.

Referring now to the figures, 10 represents a main body part or lower shank having a cutting jaw or blade 11 and a handle 12 with a guard portion or arm 13 extended thereover. This shank 10 thereby provides for the lower cutting jaw. Connected to the part 10 for free cutting action is an intermediate lever providing an upper jaw 14 having a cutting edge or blade 15 adapted to cooperate with the cutting jaw portion 11 of the part 10. This upper jaw part 14 is pivotally connected to the part 10 by a bolt 16.

Extending upwardly and forwardly from the part 10 and over the jaw portion 11 is a supporting arm 18 for an operating lever or upper shank 19 which is pivotally connected to the upper end of the support 18 by a bolt 21. This upper operating member 19 has a handle portion 22 with a guard 23 extended thereover. To operate the shears, the hand is extended over the handle portions 12 and 22 and these portions are brought together to effect the cutting operation upon the sheet metal.

The operating lever 19 has a plurality of longitudinally spaced notches therein as indicated at 24 into which a projection 25 of a fulcrum element or cam 26 may be extended to retain the cam in its adjusted location along the lever 19. The cam is retained in one of the notches by a spring 27 adapted to ride along the top of the lever 19 when an adjustment of the cam is being effected, and the spring is mounted in a U-shaped member 28 having legs extended downwardly over the sides of the lever 19 and fixed by welding to the cam 26.

This cam 26 engages with the upper cutting jaw 14 at a location therealong depending upon the notch in which is fitted the projection 25.

The upper jaw 14 has a screw 29 extended into the same. In the support 18 of the main part 10 is an elongated slot 31 through which the screw 29 is extended. This screw and slot means limits the outward and downward movement of the lever of the upper jaw lever 14. A spring 32 is fixed to the part 10 by rivets 33, Fig. 2, and serves to elevate the lever 14 and to return the same to the open position automatically for the release of the handle portions 12 and 21.

In order to adjust the length of cut so as not to crimp the metal, there is provided an adjusting screw 34 threaded in a nut portion 35 and having a head 36 adapted to engage with the operating lever 19 to serve as a stop. The nut 35 is fixed to a recess in the main part 10.

While various changes may be made in the detail construction, it shall be understood that such changes shall be within the spirit and scope of the present invention as defined by the appended claims.

I claim:

1. A pair of multiple power shears comprising a lower shank with a handle on one end, a blade on the opposite end and having an extended arm positioned above the blade, an intermediate lever pivotally mounted on the lower shank at a point substantially midway of the length thereof and having an upper blade thereon positioned to coact with the blade of the said lower shank, an upper shank pivotally mounted on the said extended arm of the lower shank and having a handle on the free end thereof, a fulcrum element positioned on the lower surface of the upper shank and positioned to engage the upper surface of the intermediate lever for actuating the said intermediate lever whereby the blade carried thereby is actuated in shearing relation with the blade of the lower shank, and means adjustably mounting the said fulcrum element on the upper shank.

2. In a pair of multiple power shears, the combination of which comprises a lower shank with a handle on one end, a blade on the opposite end and having an extended arm positioned above the blade, said shank having a vertically disposed slot therein spaced from the inner end of the blade, an intermediate lever pivotally mounted on the lower shank at a point substantially midway of the length thereof and having an upper blade thereon positioned to coact with the blade of the said lower shank, a pin with a head on the outer end thereof carried by the said intermediate lever and positioned in the slot of the lower shank, an upper shank pivotally mounted on the said extended arm of the lower shank and having a handle on the end thereof opposite to the end pivotally mounted on the arm of the lower shank, said upper shank having notches in the lower surface thereof, a fulcrum element carried by the said upper shank and having a projection positioned in one of the notches in the lower surface of the upper shank, resilient mounting means retaining the fulcrum element on the upper shank, and a screw threaded in the lower shank and positioned to be engaged by the upper shank to limit closing movement of the upper shank for controlling shearing action of the blade.

ROBERT H. McCOY.

REFERENCES CITED

The following references are of record in the file of this patent:

UNITED STATES PATENTS

| Number | Name | Date |
| --- | --- | --- |
| 202,446 | Leypoldt | Apr. 16, 1878 |
| 949,337 | Trogner | Feb. 15, 1910 |
| 1,457,527 | Johnsen | June 5, 1923 |

FOREIGN PATENTS

| Number | Country | Date |
| --- | --- | --- |
| 24,692 | Sweden | May 9, 1908 |